July 11, 1950

R. S. GAUGLER 2,514,572

ABSORPTION REFRIGERATING APPARATUS

Filed Sept. 8, 1947

INVENTOR.
Richard S. Gaugler
BY Spencer Hardman and Fehr
Attorneys

July 11, 1950     R. S. GAUGLER     2,514,572
ABSORPTION REFRIGERATING APPARATUS
Filed Sept. 8, 1947     3 Sheets-Sheet 2

INVENTOR.
Richard S. Gaugler
BY Spencer Hardman and Fehr
attorneys

July 11, 1950  R. S. GAUGLER  2,514,572
ABSORPTION REFRIGERATING APPARATUS
Filed Sept. 8, 1947  3 Sheets-Sheet 3

INVENTOR.
Richard S. Gaugler
BY
Spencer Hardman and Lehr
attorneys

Patented July 11, 1950

2,514,572

UNITED STATES PATENT OFFICE 2,514,572

ABSORPTION REFRIGERATING APPARATUS

Richard S. Gaugler, Dayton, Ohio, assignor to General Motors Corporation, Dayton, Ohio, a corporation of Delaware Application September 8, 1947, Serial No. 772,739

11 Claims. (Cl. 62—119.5)

This invention relates to absorption refrigeration apparatus in which hot refrigerant and solvent vapor discharged from the generator is brought into intimate contact with the rich liquor flowing from the absorber to the generator. This application is a continuation-in-part of my copending application S. N. 510,587 filed November 17, 1943, now Patent No. 2,466,541.

The efficiency of absorption refrigeration apparatus to an important degree depends on the efficiency of the absorber and fractionator wherein the refrigerant is transferred between the solvent liquid and a gas or vapor. To secure maximum transfer it is necessary to obtain in some way intimate contact between the liquid and the gas.

It is an object of my invention to provide a refrigeration structure for holding and conducting liquid in a thin minutely turbulent film of liquid of a large area which is freely exposed on both sides to intimate contact with flowing gas.

It is another object of my invention to provide suitable means providing ample intimate extensive contact between a thin film of rich liquor from the absorber and hot vapor from the generator within the receiver container to secure high efficiency from the system at low cost.

These objects are attained by providing within the receiver a wire screen structure formed of two capillary wire screen portions having large areas in intimate contact with each other and having a sheet metal member spaced a short distance beneath, with a wire screen thereon for catching liquid drained from the double screen structure. There is also a sheet metal member spaced above the double screen structure which holds liquid in a thin film and is provided with a cover. The hot refrigerant absorption vapor from the generator is discharged beneath the screen structure and flows between each set of members from the bottom to the top in intimate contact with the thin liquid films.

Further objects and advantages of the present invention will be apparent from the following description, reference being had to the accompanying drawings, wherein a preferred form of the present invention is clearly shown.

Figure 1:
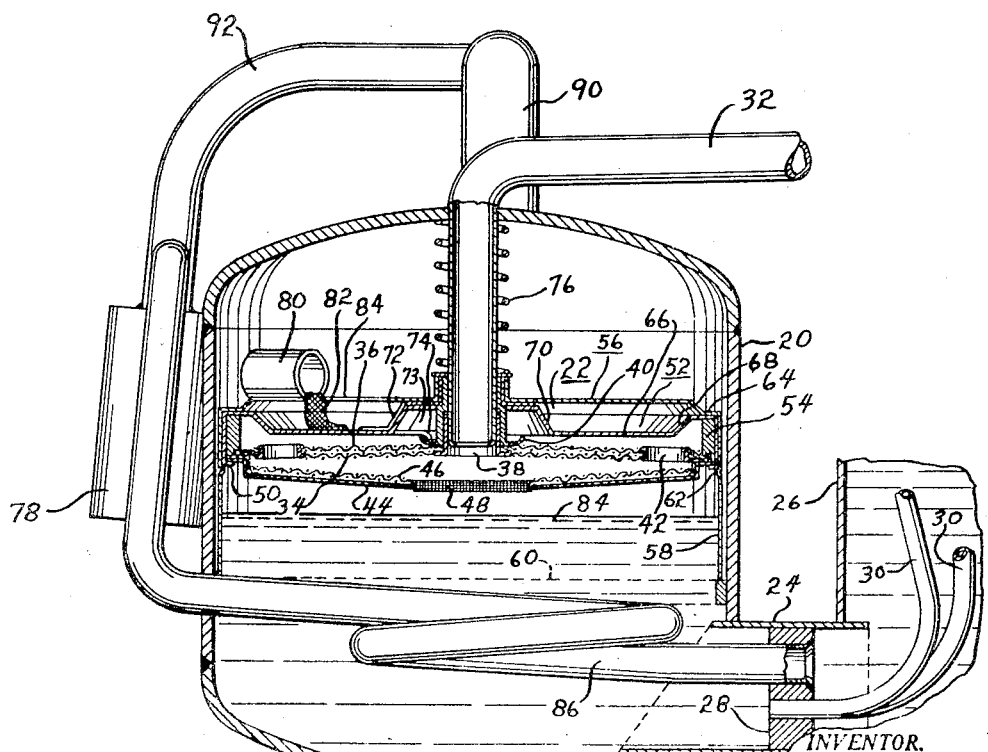
Fig. 1 is a vertical sectional view taken along the line 1—1 of Fig. 2, disclosing a fractionator located in the receiver and adjacent parts.

Referring now to the drawings and more particularly to Fig. 1, there is shown a receiver 20 containing a fractionator 22. The lower portion of the receiver 20 is connected by a short tube 24 with a lower portion of a generator 26 which may be like the generator shown in the Gaugler Patent 2,422,401 issued June 17, 1947. The short tube 24 contains a dividing wall 28 from which extends a plurality of small vapor lift tubes 30 by which liquid in the receiver is lifted up to the level of liquid in the generator 26, as explained in said patent. The generator 26 is heated by a gas burner 27. The vapor generated in the generator is conducted to receiver 20 by the vapor pipe 32 which enters the central portion of the top of the receiver 20 and extends directly downwardly along the axis of the receiver 20.

The fractionator 22 is in axial alignment with the portion of the vapor tube 32 which extends into the receiver 20. The principal element of the fractionator 22 is a set of slightly conical wire screen members 34 and 36 which have central apertures which receive a flanged sleeve 38. This flanged sleeve 38 has its sleeve portion extending within the sleeve portion of the distributor head 40. These members 38 and 40 telescope together so that the edges of the central apertures of the screens 34 and 36 are gripped between the flange of the member 38 and the bottom of the distributor head 40. Around the edge portions of the screens 34 and 36 there are provided six symmetrically positioned eyelets 42 which, together with the members 38 and 40, serve to hold the screens in direct intimate area contact with each other to form a capillary structure capable of holding and conducting liquid in a thin film. The eyelets also serve as passages to permit the flow of vapor from beneath the screens to the space above the screens.

Beneath the screens 34 and 36 there is provided a sheet metal bottom plate 44 which is slightly conical in shape, but tapered oppositely to the screens 34 and 36. This bottom plate 44 has a large central aperture and resting in direct intimate area contact upon the upper surface of the plate 44 is a slightly conical circular screen member 46 having a flanged central aperture in which the flange portion 48 extends through the central aperture in the member 44. The rim of the sheet metal bottom plate 44 is offset upwardly to form an offset flange which is clamped between the lower edge 50 of the sheet metal top plate 52 and a spacer ring 54. The screen member 46, like the bottom plate 44, is provided with an offset shoulder and the periphery of this offset shoulder together with the peripheries of the screen members 34 and 36 are held against a shoulder provided on the spacer 54 by the offset shoulder of the bottom plate 44. Above the top plate 52 is a sheet metal body member 56 having a wide downwardly extending flange 58 which rests upon a large supporting ring 60 fastened within the receiver 20. The wide flange 58 is provided with a bead 62 by which the assembly composed of the bottom plate 44, the screens 46, 34 and 36, the ring 54 and the top plate 52 are held tightly against the shoulder 64 provided upon the body member 56.

A wide flat annular groove 66 is provided in the upper surface of the top plate 52. This groove 66 is bordered on the outside by sloping side walls 68 and on the inside by the sloping side walls 70 which confine the liquid to the surface of the groove 66. At one point in the groove 66 there is provided a partition 72 which extends entirely across the groove 66 and provides a dam. Upon one side of this partition the sloping side wall 70 is cut out forming an opening 73 and bent down and curled to form a spout 74 which extends into the annular cup portion of the distributor 40. Between the top plate 52 and the top of the body member 56, there is provided a flanged spacer fitting upon the top of the distributor 40. The cutting out and turning down of the spout 74 from the wall 70 provides the opening 73 in this wall 70 directly above the spout 74 through which both gas and liquid may flow. A washer fits on top of the distributor member 40, spacer and the body member 74, and is pressed against by a spring 76 threaded on the tube 32 and serves to hold the fractionator assembly in place against the ring 60.

Rich liquor is supplied from the absorber 93 through an interchanger 78 and the pipe 80 to the interior of the receiver 20. The mouth of the pipe 80 is provided with capillary material 82, such as wire gauze, braided wire sleeving or wire screen which assists in the smooth draining of rich liquor from the tube 80. An opening 84 is provided in the body member 56 for receiving the tube 80 and the capillary material 82. The capillary material 82 contacts the groove 66 close to the partition 72 upon the side opposite the spout portion 74. This forces the rich liquor deposited upon the top plate 52 to flow counterclockwise in a thin film substantially 360 degrees in the groove 66 before it can flow over the lip or spout 74 into the annular cup portion of the distributing member 40.

The bottom of the cup portion of the distributing member 40 is provided with a dozen small holes which evenly distributes the rich liquor to the screens 34 and 36, held in intimate contact with each other throughout, as before explained. Preferably these capillary screens are of 40 mesh .010" steel wire. The rich liquor is held and conducted by these screens in a very thin film of large area and each of the interstices holds a small pool of liquid, and since these screens are slightly conical, the liquid will flow by gravity around the intersecting wire strands from one interstice or pool to another. This causes a very minute turbulence of the liquid in each tiny pool so that new molecules are exposed in every move from one tiny pool to another. Due to the effect of gravity there tends to be more liquid on the bottom of the lower screen and more of the flow takes place on its lower face. When the liquor reaches the peripheral edges of the screens 34 and 36 it drains onto the bottom plate 44. The screen 46 on top of the slightly conical bottom plate 44 distributes the liquid over the entire surface of the bottom plate 44 substantially equally and slows the draining process. The screen 46 also provides turbulence for the liquid flowing on the bottom plate 44 over the intersections of the strands until it reaches the central aperture wherein the screen 46 is formed into a lip 48 to make uniform the drainage of the liquid from the bottom plate 44.

The vapor from the generator 26 which is high in ammonia and low in water vapor is discharged from the lower end of the tube 32 with sufficient velocity to cause it to contact the surface 84 of the liquid in the receiver 20 which is made up of liquid drained from the bottom plate 44. The liquid in the bottom of the receiver 20 is heated by weak liquor flowing through the pipe coil 86 which has one end connected to and extending through the dividing wall 28 to carry hot weak liquor from the bottom of the generator 26 to the top of the interchanger 78. After being cooled in the interchanger 78 this weak liquor passes through the tube 98 into the absorber 93. The hot mixture of ammonia and water vapor discharged from the pipe 32 picks up whatever ammonia is vaporized upon the surface 84 of the liquid in the receiver and thence flows upwardly through the aperture within the flange 48 and then spreads radially flowing between the screens 46 and 34. Here the hot water vapor in the gas is attracted by the cooler liquid upon, and held by the screens and is condensed therein and consequently ammonia vapor in the liquor in the screens is driven out by the heat of condensation and by the sensible heat of the gas. After the gas has flowed to the peripheral edge of the screens it passes upwardly through any one of the six eyelets 42 and then is forced to flow inwardly. In its inward flow the gas is in intimate contact below with the liquid held by the upper screen 36 so that there is a further transfer of water vapor from the gas to the liquid in the screen and liberation of ammonia from the liquid in the screen to the gas or vapor. Also this gas flows on the bottom side of the top plate, thus heating the top plate and causing the ammonia from the rich liquor traveling around the groove 66 in a thin film to be evaporated. After reaching the central portion of the top plate 52 gas passes through the opening in the inner wall 70 provided at lip or spout 74. The partition 72 forces this gas to pass clockwise through the groove 66, being confined by top of the body member 56 and sloping side walls 68 and 70, so that additional water vapor is absorbed from the flowing gas by the liquor in the groove 66 and the gas acquires ammonia vapor from the liquor flowing in the groove 66. The gas is then discharged through the opening 84 in the top plate 56 with the ammonia saturation substantially at the maximum for the liquor as supplied by the tube 80. This gas then flows through the outlet 90 to a suitable rectifier where additional water vapor is removed and thence passes to a condenser 95 to be condensed. The condensed ammonia flows by gravity from the condenser 95 into the evaporator 97. Evaporation of the condensed ammonia in the evaporator 97 is promoted by the circulation of an inert gas between the evaporator 97 and the absorber 98 through the gas heat exchanger 99. The top of the liquid heat exchanger 78 is connected by a tube 82 to the outlet tube 90 to provide a vent to equalize pressures in the weak liquor tubes.

By virtue of this arrangement the receiver 20 serves as a housing for the fractionator 22 and water vapor is removed from the generator vapor and its ammonia content increased through a favorable transfer condition.

Figure 4:
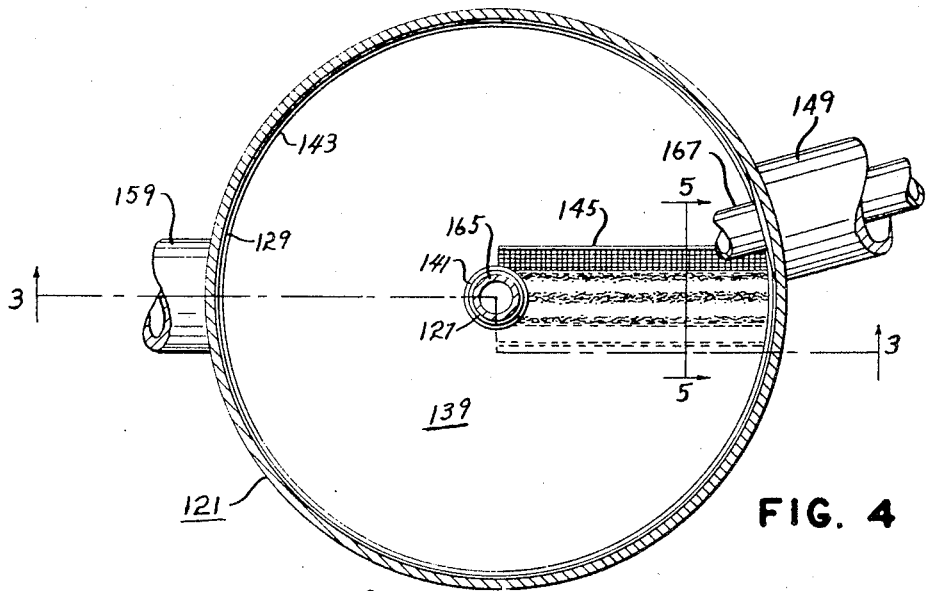
Fig. 4 is a horizontal sectional view of the receiver and fractionator disclosed in Fig. 3.
Figures 3, 5:
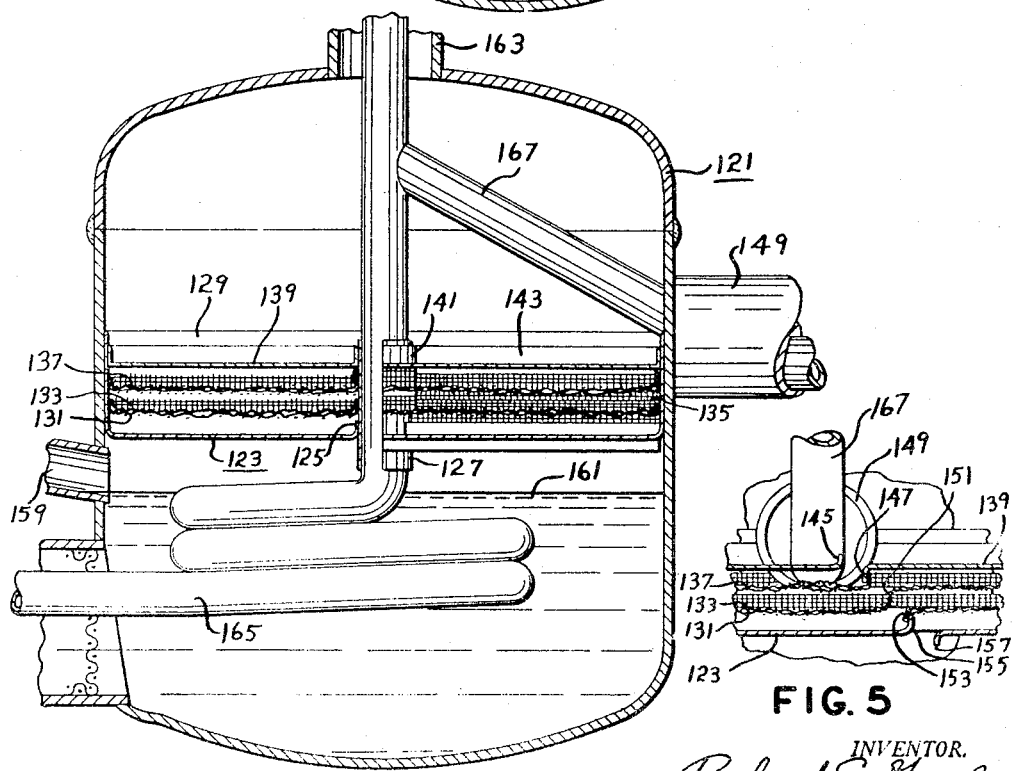
Fig. 3 is a vertical sectional view taken along the line 3—3 of Fig. 4 disclosing a modified form of receiver and fractionator embodying another form of my invention.
Fig. 5 is a sectional view taken along the line 5—5 of Fig. 4.
Figure 6:
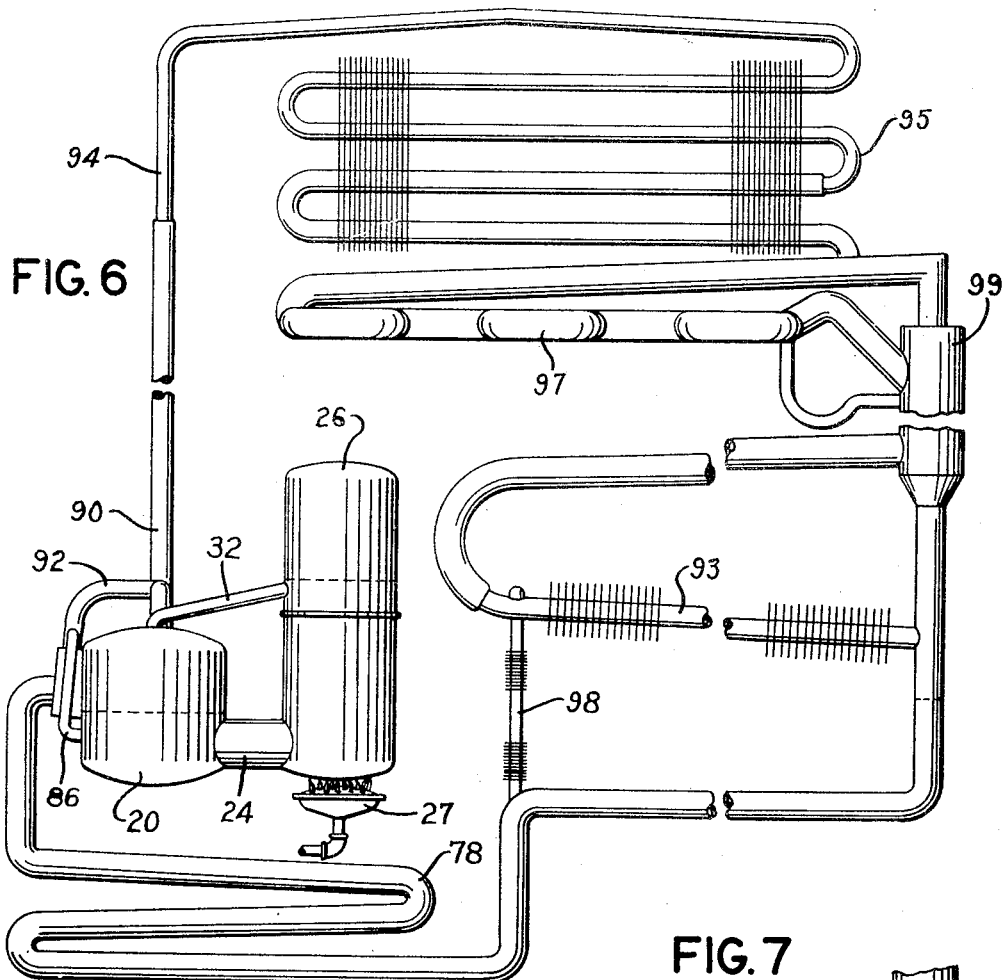
Fig. 6 is a diagrammatic view of the form of my receiver shown in Figs. 1 and 2 together with the remaining elements of an absorption refrigerating system.
Figure 7:
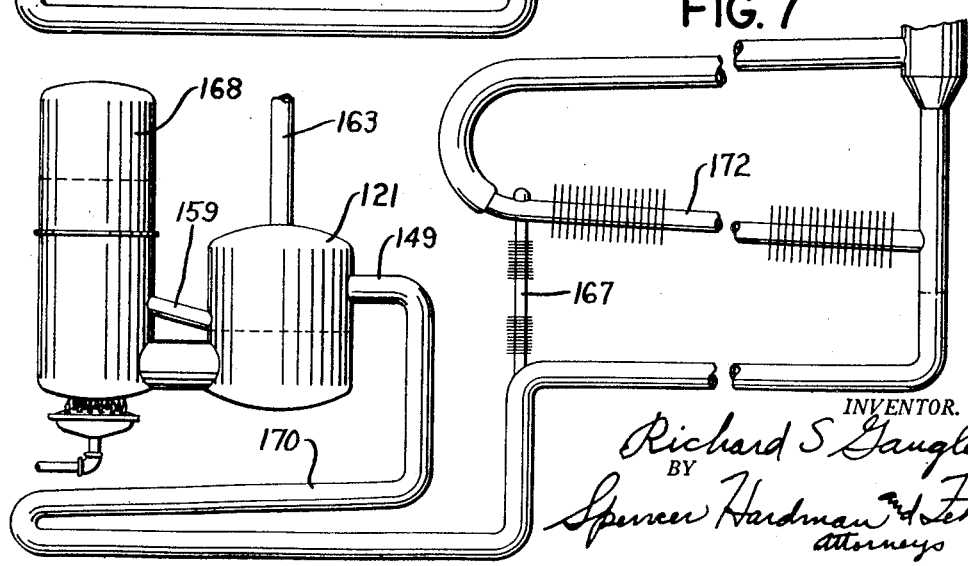
Fig. 7 is a diagrammatic view of the receiver shown in Figs. 3 and 4 together with sufficient elements to show how it would be used with the remaining elements shown in Fig. 6.

A second form of fractionator within the receiver is shown in Figs. 3 to 5. In this form there is provided in the receiver 121 a bottom plate 123 with an inner up-turned flange 125 fastened to a sleeve 127 and an outer up-turned flange 129 which is fastened to the wall of the receiver 121. The bottom plate 123 is flat and capable of holding a thin film of liquid throughout this large flat area.

Above the bottom plate 123 are two disks 131 and 133 of wire screen material in direct intimate area contact with each other throughout, forming a capillary structure capable of holding and conducting a thin liquid film. At their central portions there are provided up-turned flanged apertures, the upper edges of which are fastened to the sleeve 127. The peripheral edges of the two screens 131 and 133 are likewise provided with up-turned flanges 135, the upper edges of which are preferably fastened to the outer up-turned flange 129 of the bottom plate 123. Above the screens 131 and 133 is a second set of screens 137 in direct intimate area contact with each other, which are fastened to the sleeve 127 and the flange 129 by up-turned edges in a similar manner. This second set of screens 137 form a second capillary structure capable of holding and conducting a thin liquid film throughout their contacting area. Above this second set of screens 137 is a top plate 139 provided with an upwardly flanged central aperture 141 fastened to the top of the sleeve 127 and an outer up-turned flange 143 fastened to the up-turned outer flange 129 of the bottom plate 123. The up-turned edges of the screens 131, 133 and 137 prevent the draining of the capillary film down the surfaces of the flange 129 and the sleeve 127.

As better shown in Fig. 5, the top plate 139 is slit transversely and provided with an up-turned edge 145 and a down-turned edge 147 forming an opening therebetween. The tube 149, which conducts strong liquor from the absorber and interchanger to the receiver, enters the receiver substantially adjacent the up-turned edge 145 and has the bottom of its inner surface substantially at the level of the upper set of screens 137 so that the rich liquor discharged by the pipe 149 is received and spread into a thin capillary film by the upper set of screens. The upper set of screens 137 are slit transversely in a manner similar to the top plate and one edge is turned up and fastened to the down-turned edge 147 of the top plate 139. The second edge 151 is turned downwardly and is fastened to an up-turned edge of a similar transverse slit in the screens 131 and 133. The second edge 153 of the slit in the screens 131 and 133 is turned downwardly and fastened to the up-turned edge 155 of a similar transverse slit in the bottom plate 123. This slit in the bottom plate 123 also has a down-turned edge 157.

Figure 2:
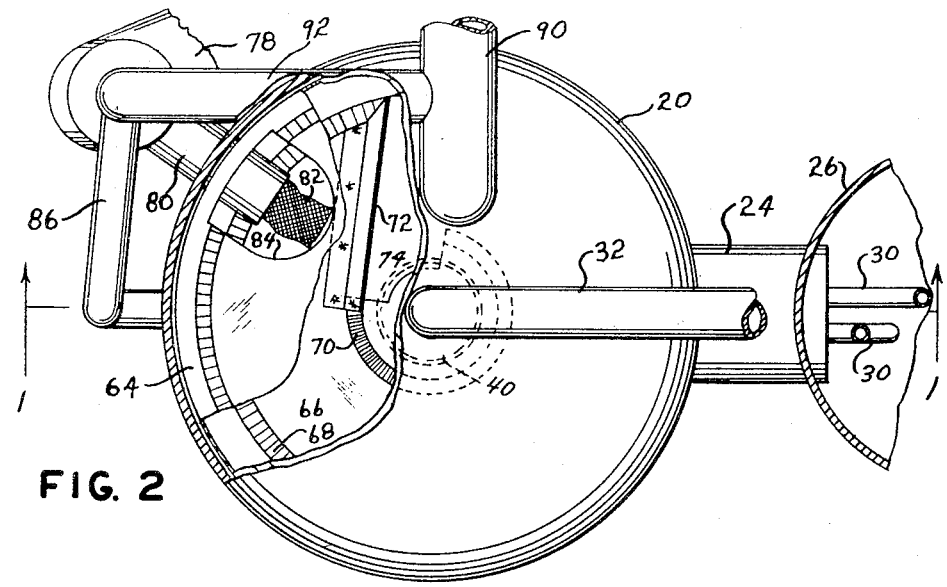
Fig. 2 is a top view, partly in section, of the receiver and fractionator disclosed in Fig. 1.

In this form of receiver, the ammonia and water vapor discharged from the generator may be conducted downwardly along the vertical axis of the receiver as is disclosed in Figs. 1 and 2, but as shown in Figs. 3 to 5 an alternative construction is disclosed in which the water and ammonia vapor generated in the generator 168 enters the receiver 121 through the pipe 159 at a level just below the bottom plate 123. In its flow across the receiver, this hot gas picks up ammonia vapor from and deposits water vapor upon the surface 161 of the rich liquor in the bottom of the receiver. The remainder of this gas passes between the lips 155 and 157 in the bottom plate 123 to the space between the lower set of screens 131 and 133 of the bottom plate 123. In this space it meets the thin flowing film of rich liquor which first travels in a counter-clockwise direction upon the upper set of screens 137 which hold and contact the rich liquor in a thin film by capillary action.

As mentioned in connection with the first embodiment the interstices of the screen members hold tiny pools of liquid which are kept in turbulence by the liquid flowing around the intersecting wire strands forming the screen members from one pool to another. Through this arrangement the liquid in a wide thin turbulent flowing film is exposed to the gas on both sides. The liquid after having passed in a counter-clockwise direction from one end of the upper set of screens to the other is drained by the down-turned lip 151 onto the lower set of screens 131 and 133 upon which the liquor is conducted in a counterclockwise direction completely around the screens to the lip 153 from which the liquor is drained onto the bottom plate 123. The lip 155 on the bottom plate 123 forces the liquid to flow entirely around the bottom plate 123 in a counterclockwise direction until it reaches the down-turned lip 157 which permits it to drain into the bottom of the receiver 121.

The gas then, after entering between the lips 155 and 157 flows in a direction opposite to the flowing film of rich liquor. In other words, a clockwise direction, and being exposed to the flowing film of liquor below and above as it passes through the passage defined by the screens 131 and the bottom plate 123. After flowing through this passage substantially 360 degrees the gas passes upwardly between the lips 151 and 153 to the passage between the upper and lower sets of screens from which point it passes in a clockwise direction substantially 360 degrees until it reaches and passes between the turned up edges 147 and 151 where it begins a third clockwise passage which is formed between the upper set of screens 137 and the top plate 139. The gas is then finally discharged between the edges 145 and 147 and escapes from the receiver 121 through the outlet pipe 163.

Weak liquor is conducted from the generator 168 through the weak liquor tube 165 having a coiled portion in the bottom of the receiver 121 which extends upwardly through the sleeve 127 and terminates within the tube 163. The tube 165 is connected to a second weak liquor tube 167 which extends through the tube 149 to the interchanger 170 and the absorber 172. The coil portion of the weak liquor tube 165 heats, and assists in vaporizing some of the ammonia in the rich liquor in the bottom of the receiver. In this fractionator the gas, in addition to contacting the liquid surface 161, contacts five liquid surfaces each having an area substantially equal to the area of the liquid surface 161. Through the contact of the gas with such extensive liquid surfaces presented, particularly in a thin film which has minute turbulence given to it by the wire screen structure, efficient transfer of the ammonia from the liquor to the vapor is obtained.

While the form of embodiment of the invention as herein disclosed, constitutes a preferred form, it is to be understood that other forms might be adopted, as may come within the scope of the claims.

What is claimed is as follows:

1. Absorption refrigerating apparatus for transferring a refrigerant between absorption liquid and a gas comprising a generator and an absorber and an enclosed container means, two large portions of wire screen in continuous direct intimate area contact with each other throughout large areas to form a thin capillary structure capable of holding and conducting throughout their contacting area a liquid film of such thinness to assure intimate contact between all of the liquid and the gas, said areas extending laterally within the container means, means for feeding rich absorption liquid from the absorber to one portion of the wire screen and draining liquid from another portion, baffle means above and below said screen, and means for flowing a gas from the generator substantially parallel to and in direct contact with the screen along both sides thereof between the baffle means and the screen for obtaining intimate contact with the rich absorption liquid to transfer some refrigerant from the rich absorption liquid to the gas.

2. Absorption refrigerating apparatus for transferring a refrigerant between absorption liquid and a gas including a generator and an absorber and an enclosed container means, two large portions of screen material in continuous direct area contact throughout large areas to form a thin capillary structure capable of holding and conducting throughout their contacting area a liquid film of such thinness to assure intimate contact between all of the liquid and the gas extending laterally within the container means, means for feeding rich absorption liquid from the absorber to one portion of the screen material and draining it from another, and means for flowing hot refrigerant and absorbent vapor from the generator parallel to and in direct contact with the screen on both sides thereof for obtaining intimate contact with the rich absorption liquid to transfer some refrigerant in the rich absorption liquid to the flowing vapor.

3. Absorption refrigerating apparatus including a generator and an absorber and an enclosed container means, two large portions of screen material in direct area contact throughout extending laterally within the container means, means for feeding rich liquor from the absorber to one portion of the screen material and draining it from another and collecting the drained liquid in the bottom of the container means, means for discharging hot refrigerant and absorbent vapor from the generator beneath said screen material, and means connecting to the container means above the screen material for conducting vapor away from the container means.

4. Absorption refrigerating apparatus including a generator and an absorber and an enclosed container means, two large portions of wire screen in direct area contact extending laterally within the container means, said container means being provided with a rich liquor inlet means connected to the absorber, said inlet means having its lowest liquid holding surface entering substantially at the highest level of the screen and having means for discharging the rich liquor substantially upon the highest portion of the screen, said screen being provided with an opening, means for discharging hot refrigerant and absorbent vapor from the generator beneath the screen, and baffle means above the screen for forcing the vapor to flow from said opening over large portions of the screen.

5. Absorption refrigerating apparatus including a generator and an absorber and an enclosed container means, a horizontal member extending within the container means, a liquid holding means capable of holding liquid in a thin film exposed on both sides extending transversely within the container means beneath but spaced from said horizontal member, means for flowing rich absorption liquid from the absorber onto one portion of said horizontal member, means for directing the liquid from said horizontal member to said liquid holding member, said container means being arranged to collect liquid discharged from the holding means beneath the holding means, means for discharging refrigerant and absorbent vapor from the generator within said container means beneath said liquid holding means and above the collected liquid, means for conducting the vapor from below the liquid holding means to above the liquid holding means beneath said horizontal member, means for conducting vapor from beneath the horizontal member to above the horizontal member, and a shield extending over said horizontal member for forcing the vapor to flow over the liquid thereon.

6. Absorption refrigerating apparatus including a generator and an absorber and an enclosed container means, a liquid inlet connection from the absorber extending to the side of the container means for feeding rich absorption liquid thereto, a horizontal sheet metal member extending within the container means at a level below said inlet connection for receiving liquid therefrom, two large portions of wire screen in direct area contact with each other extending laterally within the container means, means for discharging liquid from the central area of said sheet metal member onto the central area of said screen portions, means for discharging vapor from the generator beneath said screen portions, said screen portions having edge portions arranged to provide a passageway for the vapor to flow from beneath the screen portions to above the screen portions, the central area of said sheet metal member having an opening to provide a passageway for said vapor.

7. Absorption refrigerating apparatus comprising a generator and an absorber and enclosed container means having a cylindrical wall portion, a vapor inlet conduit extending from the generator having its outlet substantially in the center of the container means, a set of two wire screen members in direct area contact with each other throughout a major portion of their areas, said wire screen members each having a conical surface with a central aperture at the highest point, said central aperture being located substantially concentric with and adjacent the mouth of said inlet conduit, an annular distributing member surrounding said inlet conduit and having its outer rim overlying the inner edge of said screen members, means for feeding rich liquor from the absorber to said distributing member so that it discharges and the discharging liquid flows onto and saturates the contacting screens and is drained from the peripheral portions and collected in the bottom of the container means, and vapor and liquid outlets for said container means.

8. Absorption refrigerating apparatus comprising a generator and an absorber and enclosed container means having a cylindrical wall portion, a vapor inlet conduit extending from the generator having its outlet substantially in the center of the container means, a set of two wire screen members in direct area contact with each other throughout a major portion of their areas, said wire screen members each having a conical surface with a central aperture at the highest point, said central aperture being located substantially concentric with and adjacent the mouth of said inlet conduit, an annular distributing member surrounding said inlet conduit and having its outer rim overlying the inner edge of said screen members, a first sheet metal member above and spaced from said screen members to form a first passageway therebetween for vapor, a second sheet metal member below and spaced from said screen members to form a second passageway, said second sheet metal member having a central aperture, said screen members being constructed to provide passageways adjacent the periphery connecting the first and second passageways, means for feeding rich liquor from the absorber to said distributing member so that the liquor discharges onto and saturates the screens, the surplus liquor draining from the peripheral portions of the screens onto said second sheet metal member, said first sheet metal member having an aperture in its central portion to permit the escape of vapor.

9. Absorption refrigerating apparatus comprising a generator and an absorber and enclosed container means having a cylindrical wall portion, a vapor inlet conduit extending from the generator having its outlet substantially in the center of the container means, a set of two wire screen members in direct area contact with each other throughout a major portion of their areas, said wire screen members each having a conical surface with a central aperture at the highest point, said central aperture being located substantially concentric with and adjacent the mouth of said inlet conduit, an annular distributing member surrounding said inlet conduit and having its outer rim overlying the inner edge of said screen members, a first sheet metal member above and spaced from said screen members to form a vapor passageway therebetween, a covering sheet metal member above and spaced from said first sheet metal member to provide a second vapor passageway, said first sheet metal member having an opening in its central portion providing communication between said passageways, said first sheet metal member also having means for discharging rich liquor into said distributing member, and means extending from the absorber for feeding rich liquor from the absorber to said first sheet metal member.

10. Absorption refrigerating apparatus including a generator and a condenser and an absorber and an enclosed container means connected between the generator and the condenser and the absorber through which the hot refrigerant and absorbent vapor flows from the generator to the condenser and the cool rich absorption liquid flows from the absorber to the generator, said container means having side wall portions and a thin liquid film conducting means extending substantially laterally between the side wall portions capable of conducting rich absorption liquid in a continuous thin film exposing a flowing liquid surface on its upper and lower faces, said container means being provided with means for conducting the rich absorption liquid from the absorber to an initial portion of the liquid film conducting means and with means for flowing the hot refrigerant and absorbent vapor from the generator parallel to and in direct contact with both the lower and the upper surfaces of said cool flowing thin film to cause condensation of the absorbent vapors and the consequent liberation of the refrigerant vapors by the rich absorption liquid to enrich the vapor flowing to the condenser, said liquid film conducting means being provided with a drainage formation to promote the flow of the liquid film from said initial portion along the conducting means to a discharge portion.

11. Absorption refrigerating apparatus including an enclosed container means, two large portions of screen material in continuous direct area contact throughout large areas to form a thin capillary structure capable of holding and conducting throughout their contacting area a liquid film of such thinness to assure intimate contact between the liquid and a gas, an absorber having means for feeding rich absorption liquid to a liquid receiving portion of the screen material, the screen material extending substantially laterally within the container means and provided with a drainage formation to promote the flow of rich absorption liquid from said liquid receiving portion to another portion for draining, a generator provided with means for drawing the drained rich absorption liquid from the container and expelling hot refrigerant and absorbent vapor into the container beneath the contacting portions of the screen material, said container containing means including baffle means above the contacting portions of the screen material for directing the flow of the hot refrigerant and absorbent vapor parallel to and in direct contact with both the upper and lower surfaces of the contacting portions of the screen material for obtaining intimate contact between the hot vapor and the cool rich absorption liquid flowing in the thin film adhering to the contacting areas of the screen material to transfer some refrigerant in the rich absorption liquid to the flowing vapor.

RICHARD S. GAUGLER.

REFERENCES CITED

The following references are of record in the file of this patent:

UNITED STATES PATENTS

| Number | Name | Date |
| --- | --- | --- |
| 1,107,455 | Sintz | Aug. 18, 1914 |
| 1,979,482 | Kohler | Nov. 6, 1934 |

FOREIGN PATENTS

| Number | Country | Date |
| --- | --- | --- |
| 245,254 | Great Britain | Jan. 7, 1926 |